United States Patent [19]

Mattingly, Jr. et al.

[11] 3,768,066

[45] Oct. 23, 1973

[54] PRINTED CIRCUIT BOARD CONNECTOR CARD GUIDE

[75] Inventors: William R. Mattingly, Jr., Santa Ana; David S. Goodman, Orange, both of Calif.

[73] Assignee: International Telephone and Telegraph Corporation, New york, N.Y.

[22] Filed: Jan. 3, 1972

[21] Appl. No.: 215,054

[52] U.S. Cl. .................................................. 339/65

[51] Int. Cl. .............................................. H01r 13/20

[58] Field of Search .................. 339/17 LM, 17 LC, 339/17 L, 65, 176 MP; 311/101 DH; 312/263; 211/26, 41, 184

[56] References Cited

UNITED STATES PATENTS

| | | | |
|---|---|---|---|
| 3,665,375 | 5/1972 | Thoms et al. | 339/17 L |
| 3,193,791 | 7/1965 | Bock et al. | 339/176 MP |
| 3,601,770 | 8/1971 | Bowley | 339/17 L |

FOREIGN PATENTS OR APPLICATIONS

| | | | |
|---|---|---|---|
| 1,452,039 | 8/1966 | France | 211/41 |
| 892,185 | 3/1962 | Great Britain | 317/101 DH |

*Primary Examiner*—Marvin A. Champion
*Assistant Examiner*—William F. Pate, III
*Attorney*—C. Cornell Remsen, Jr. et al.

[57] ABSTRACT

A printed circuit board connector having a central channel and a plurality of pairs of opposed cavities on opposite sides of the channel. A printed circuit board card guide is insertable in the cavities and comprises an elongated member having a slot extending from one end of the guide. The thickness of the slot is approximately equal to the thickness of a printed circuit board which is inserted therein. Side bar members are formed at the other end of the card guide and the side bar members are insertable in the cavities of the printed circuit board connector. The card guides are insertable on both ends of the printed circuit board connector and may contain a pair of side bar members for insertion in a pair of adjacent longitudinal cavities. The cavities are normally the same cavities into which electrical contacts are inserted.

5 Claims, 7 Drawing Figures

PRINTED CIRCUIT BOARD CONNECTOR CARD GUIDE

The invention relates in general to printed circuit board connector card guides and more particularly to a detachable card guide for insertion in a printed circuit board connector contact cavity.

BACKGROUND OF THE INVENTION

Conventional card guides for printed circuit board connectors are normally molded-in as a continuous part of the printed circuit board connector insulator housing. Typically, such card guides prove extremely cumbersome when the printed circuit board connector must be moved or turned over during the assembly process of wiring conductors to the printed circuit board connector contacts. To make the printed circuit board connector guides attachable after an assembly process of the connectors, or so as to enable shipment of the connectors in a less bulky package, it has been found desirable to make the card guides attachable only when needed.

Heretofore, molded bosses at the bottom of the guides were inserted into molded cavities on the extended length insulator housing of the printed circuit board connector. Typically, such card guides would tend to break off, due to their extremely long length and unstable connection between the card guide and the insulator housing. Moreover, when the card guide was attached to the insulator housing, it was necessary to press-fit the card guide to the housing. On numerous occasions, the card guide would break or crack off with the result that the boss would be positioned in the card guide and new card guides could no longer be inserted therein.

In order to overcome the attendant disadvantages of prior art printed circuit board connectors, the present invention provides extremely stable card guides which may be inserted into the printed circuit board housing after the connector has been fully assembled and is ready for insertion of a printed circuit board therein. The attachable card guide is extremely stable and its strength is greater than that of the insulator housing itself. Moreover, the card guide is readily removable when necessary, and cementing of the card guide to the insulator housing is not necessary. Further, the card guides may be inserted in the printed circuit board housing at numerable positions such that the printed circuit board connector can be used with various length printed circuit boards.

The advantages of the invention, both as to its construction and mode of operation, will be readily appreciated as the same becomes better understood by reference to the following detailed description when considered in connection with the accompanying drawings in which like referenced numerals designate like parts throughout the figures.

DESCRIPTION OF THE PREFERRED EMBODIMENT

Figure 4:
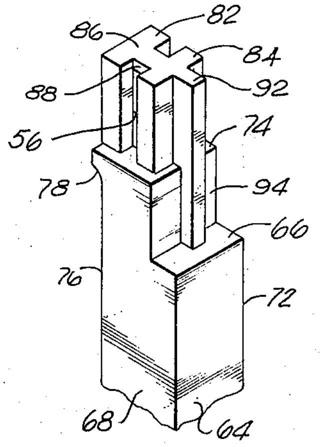
FIG. 4 depicts the card guide of FIG. 1 in a bottom perspective view.
Figure 2:
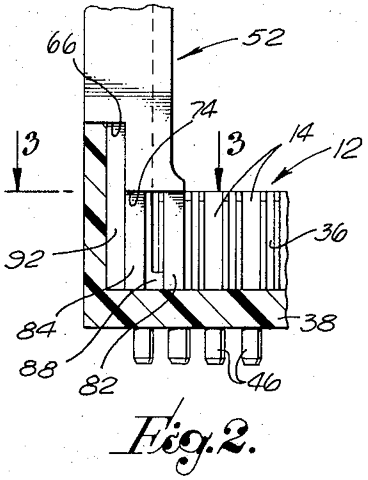
FIG. 2 illustrates a side view of the connector partly in section with the card guide inserted therein.
Figure 3:
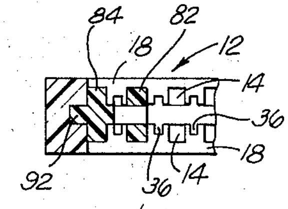
FIG. 3 illustrates a plane view partly in section of the connector of FIGS. 1 and 2 taken along the line 3—3 of FIG. 2.
Figure 1:
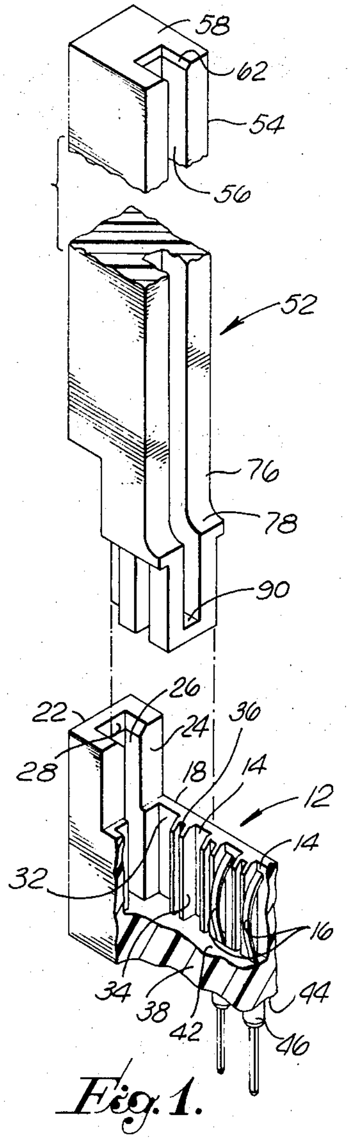
FIG. 1 depicts an exploded perspective view of a printed circuit board connector and a card printed circuit board card guide partly in section.
Figure 5:
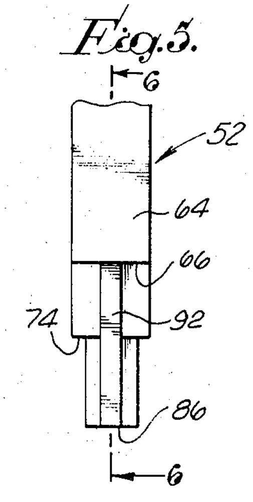
FIG. 5 illustrates a rear view of the card guide.
Figure 6:
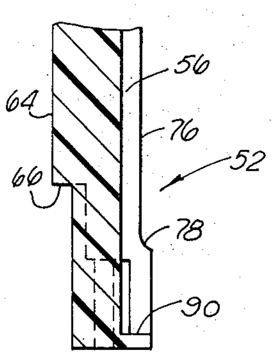
FIG. 6 shows a side view of the card guide partly in section taken along the line 6—6 of FIG. 5.
Figure 7:
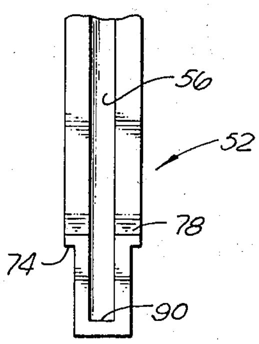
FIG. 7 depicts a front view of the card guide.

Referring now to the drawings, there is shown in FIG. 1 an insulator housing 12 adapted to have a printed circuit board inserted therein. The housing contains a plurality of cavities 14 into which electrical contacts 16 are inserted. The housing comprises a pair of side walls 18 and an end wall 22. At the junction of the end wall and side walls, the side walls are raised slightly as at 24. The junction of the end wall 22 and the side walls 24 form a generally U-shaped opening 26 which is bevelled as at 28 at the top surface. The U-shaped cavities 14 are defined by an inner surface 32 of the side wall 18 and side walls 34 which extend into the central portion of the housing. As can be seen in FIG. 3, a plurality of pairs of cavities 14 is formed opposite each other along the longitudinal axis of the housing 12.

The side walls 34 are normally slotted as at 36 so as to enable polarization members to be inserted therein. The side walls 34 and inner surface 32 of the insulator housing terminate at a bottom wall 38 at the top surface 42 thereof. The bottom wall 38 also comprises a bottom surface 44 having insulator bushings 46 extending therefrom which provide insulator protection for the portions of the electrical contact 16 which extend therethrough. The insulator housing 12 as thus far described is of conventional construction.

A printed circuit board connector card guide 52 is adapted to be inserted into the insulator housing 12. The card guide contains a top portion 54 which is generally rectangular in cross-section and contains a three-sided slot 56 which terminates at one end of the card guide in the top surface 58 of the card guide. At the junction of the slot 56 and the top surface, the slot may be bevelled as at 62 so as to facilitate entry of printed circuit boards.

Referring now to FIGS. 4 through 7, the card guide is shown in greater detail. The rear surface 64 of the guide terminates at a downwardly facing shoulder 66 whereas the side surfaces 68, 72 of the card guide extend beyond the shoulder 66 at the front of the card guide and terminate at a downwardly facing surface 74. The front surface 76 of the card guide flares outwardly as at 78 prior to terminating at the surface 74. Extending downwardly from the surface 74 are a pair of side bars 82, 84. The members 82 and 84 terminate at a bottom surface 86. A cross-bar member 88 interconnects the side bars 82 and 84. The top surface 90 of the member 88 defines the end of the slot 56. Further, adjacent the side bars 84 is a member 92 which is in a plane parallel to the cross member 86 and of approximately the same thickness.

A portion of the member 92 terminates at the bottom facing surface 74 whereas the remainder continues to the bottom facing surface 66. It should be noted that the surfaces 66 and 74 define a rearward facing surface 94 at their junction.

As can be readily seen, the card guide 52 is insertable into the housing 12. The side bars 82 and 84 are of such dimensions that they fit into a pair of opposed cavities 14 as can be readily seen in FIG. 3. Moreover, the member 92 is inserted into the opening 26 formed at the junction of the side walls 18 and the end wall 22. When the card guide 52 is fully inserted into the housing 12, the surface 74 will abut the top surface of the side walls 18 while the surface 66 will abut the top surface of the end wall 22 thus correctly positioning the card guide in the housing.

Alternatively, it should be understood that should a smaller length printed circuit board be utilized with the connector depicted in FIGS. 1–7, the card guide can be inserted inwardly from the end wall 22 and the correct positioning of the card guide would be determined by the surface 74 abutting the top surface of the end wall 18.

Thus, as can be readily seen, a printed circuit board can be inserted into the slot 56 of the card guide. The card guide is easily removable for shipment or for movement of the printed circuit board connector during the assembly process of wiring connectors to the printed circuit board connector contacts.

What is claimed is:

1. A printed circuit board connector having a central elongated, upwardly opening channel for receiving a printed circuit board and a plurality of pairs of opposed cavities on opposite sides of said channel, the cavities of each said pair facing one another;

and a printed circuit board card guide insertable into and removable from said cavities comprising an elongated upright member having a vertical slot therein extending to the upper end thereof, said slot having a width approximately equal to the thickness of a printed circuit board to be inserted therein, and oppositely extending side bar members formed at the lower end of said elongated member, said side bar members having a configuration complementary to that of a pair of opposed cavities whereby said side bar members are insertable in said cavities for stable seating therein.

2. A printed circuit board connector in accordance with claim 1 wherein there are provided a pair of said card guides inserted at opposite ends of said central channel so that the slots therein face each other.

3. A printed circuit board connector in accordance with claim 1 wherein electrical contacts are mounted in selected ones of said cavities for engagement with the sides of a printed circuit board inserted in said channel.

4. A printed circuit board connector in accordance with claim 1 wherein said printed circuit board connector embodies a top surface, said elongated member having a downwardly facing surface thereon joining said lower end to the upper portion of said elongated member, said top surface forming a seat for said downwardly facing surface for positioning said printed circuit board connector card guide thereon.

5. A printed circuit board connector in accordance with claim 1 wherein said card guide is formed with a pair of said oppositely extending side bar members joined by a cross-bar member and wherein said pair of side bar members are insertable in adjacent longitudinal opposed cavities.

* * * * *